United States Patent [19]

Saunders et al.

[11] Patent Number: 5,541,629
[45] Date of Patent: Jul. 30, 1996

[54] PRINTHEAD WITH REDUCED INTERCONNECTIONS TO A PRINTER

[75] Inventors: Michael B. Saunders; Andre Garcia, both of Corvallis, Oreg.; S. Dana Seccombe, Foster City, Calif.; Rajeev Babyal, Corvallis, Oreg.; James R. Hulings, Fort Collins, Colo.

[73] Assignee: Hewlett-Packard Company, Palo Alto, Calif.

[21] Appl. No.: 312,489

[22] Filed: Sep. 26, 1994

Related U.S. Application Data

[63] Continuation of Ser. No. 958,833, Oct. 8, 1992, abandoned.

[51] Int. Cl.$^6$ ..................................................... B41J 2/05
[52] U.S. Cl. ........................................................... 347/12
[58] Field of Search ........................... 346/76 PH; 347/10, 347/11, 12, 13, 58, 59, 180–182; 340/825.81, 825.82; 400/120.05, 120.06

[56] References Cited

U.S. PATENT DOCUMENTS

| | | | |
|---|---|---|---|
| 3,852,563 | 12/1974 | Bohorquez et al. | 346/76 PH |
| 4,317,124 | 2/1982 | Shirato et al. | 347/56 |
| 4,345,262 | 8/1982 | Shirato et al. | 346/140 R |
| 4,719,477 | 1/1988 | Hess | 346/140 R |
| 4,875,059 | 10/1989 | Masuda | 347/94 |
| 4,887,098 | 12/1989 | Hawkins et al. | 346/140 R |
| 4,947,192 | 8/1990 | Hawkins et al. | 346/140 R |
| 5,006,864 | 4/1991 | Ayata et al. | 346/33 R |
| 5,053,790 | 10/1991 | Stephenson et al. | 346/76 PH |
| 5,083,137 | 1/1992 | Badyal et al. | 346/1.1 |
| 5,144,336 | 9/1992 | Yeung | 346/76 PH |
| 5,187,500 | 2/1993 | Bohorquez et al. | 346/140 R |
| 5,223,853 | 6/1993 | Wysocki et al. | 346/1.1 |

FOREIGN PATENT DOCUMENTS

| | | | |
|---|---|---|---|
| 0405574 | 1/1991 | European Pat. Off. | B41J 2/05 |
| 0461938 | 12/1991 | European Pat. Off. | B41J 2/05 |

OTHER PUBLICATIONS

Ream, G. L., "Multiplex Drivers For A Drop–On–Demand Print Head" IBM Technical Disclousre Bulletin, vol. 25, No. 11A Apr. 1983 pp. 5652–5655.

*Primary Examiner*—Benjamin R. Fuller
*Assistant Examiner*—Alrick Bobb

[57] ABSTRACT

The interconnections for transmitting print commands from a printer to a printhead are reduced by the use of on-printhead circuitry. In a basic embodiment, the printhead driver circuitry includes a matrix of drivers controlled by gates, power and control interconnections. Interconnections are reduced by enabling rows and columns of drivers with the power and control interconnections. A multiplexer may also be added to further reduce control interconnections. In an advanced embodiment, the printhead driver circuitry includes a register for converting a serial stream of print enable signals from the printer into a format for applying such signals concurrently to switching devices for one or more heater resistors. An address generator on the printhead generates address signals in response to an address generating signal from the printer. The printer provides constant power to the printhead so that energizing of the heater resistors is a function of the address and print enable signals and not of the power. Variations on the basic and advanced embodiments are also shown and described.

17 Claims, 5 Drawing Sheets

5,541,629

PRINTHEAD WITH REDUCED INTERCONNECTIONS TO A PRINTER

CROSS REFERENCE TO RELATED APPLICATION

This is a continuation of application Ser. No. 07/958,833 filed on Oct. 8, 1992, now abandoned.

BACKGROUND OF THE INVENTION

This invention relates generally to thermal inkjet printing. More particularly, this invention relates to a novel printhead design for increasing the number of inkjet nozzles on the printhead while minimizing the number of electrical interconnections between the printer and printhead. The term "printhead" as used herein includes an ink source as well as an ink drop generating mechanism attached to the source and is also known as a cartridge or pen.

Print quality and throughput are important objectives in the design of thermal inkjet printers. Print quality is a function of, among other things, the distance between the inkjet nozzles on the printhead. Higher print quality produces crisper output and more colors through better dithering. Throughput is a function of the width of the printed swath. The wider the swath, the fewer passes the printhead make to print a page.

Both of these objectives can be met by increasing the number of inkjet nozzles on the printhead. By placing nozzles closer together, the print quality can be improved. By placing more nozzles on the printhead, the width of the printing swath is increased. However, adding nozzles requires adding associated drivers, which comprise heater resistors, control logic and power and control interconnections. These interconnections are flexible wires or equivalent conductors that electrically connect the drivers on the printhead to printhead interface circuitry in the printer. They may be contained in a ribbon cable that connects on one end to control circuitry within the printer and on the other end to driver circuitry on the printhead.

Interconnections are a major source of cost in printer design, and adding them to increase the number of drivers increases the cost. Interconnections also affect the reliability of the printer, with more interconnections increasing the likelihood that the printer will fail. Thus as the number of drivers on a printhead has increased over the years, there have been attempts to reduce the number of interconnections per driver. One approach that is presently being investigated is called "integrated drive head" or IDH multiplexing. In IDH, the drivers are split into groups known as primitives. Each primitive has its own power supply interconnection ("primitive select") and return interconnection ("primitive return"). In addition, a number of control lines are used to enable particular drivers. These control or address lines are shared among all primitives. This approach can be thought of as an XY matrix where X is the number of primitives (rows) and Y is the number of drivers per primitive (columns). The energizing ("firing") of each driver resistor is controlled by a primitive select and by a transistor such as a MOSFET that acts as a switch connected in series with each resistor. By powering up one or more primitive selects (X1, X3, etc.) and driving the associated gate of the transistor (Y2, for example), multiple heater resistors may be fired simultaneously. The number of interconnections required for such a matrix is fewer than one per driver. This is markedly fewer than in a direct drive approach, wherein each driver has its own primitive select and shares a primitive common with the other drivers.

The matrix approach in IDH multiplexing offers an improvement over the direct drive approach. Yet as presently contemplated the matrix approach has its drawbacks. The primitive select interconnection for each primitive must be driven by a switching power supply that can rapidly switch between on and off states. Such supplies are more expensive and more prone to failure than constant, i.e., static, power supplies. Furthermore, the number of interconnections with such a matrix is still large, on the order of $3\sqrt{n}$, where n is the number of drivers. Thus increasing the number of drivers significantly, even with the matrix, still results in an undesirable increase in the number of interconnections.

SUMMARY OF THE INVENTION

An object of the invention, therefore, is to increase the number of inkjet nozzles on a printhead without increasing the number of interconnections between the printhead and printer.

Another object of the invention is to minimize the number of interconnections required per driver on the printhead.

Yet another object of the invention is to reduce the cost or complexity of printer control circuitry by shifting control functions from the printer to the printhead.

In one embodiment, a printhead according to the invention includes a power interconnection for providing constant power to the printhead and a control interconnection for providing a print command to the printhead. A plurality of heater resistors are each operably connected to the power interconnection. A switching device is also provided for selectively energizing each heater resistor with power from the power interconnection. Each switching device is responsive to a print command from the control interconnection for energizing the heater resistor.

In another embodiment, the printhead includes a plurality of groups of heater resistors and a power interconnection for selectively providing power to each group when the interconnection is enabled. Switching devices are also provided in a plurality of groups for selectively energizing each heater resistor within a group. A control interconnection operates each group of switching devices when the interconnection is enabled. A heater resistor on the printhead is energized if both the power interconnection and control interconnection for the resistor are enabled.

Variations on the inventive printhead include multiplexed interconnections, energy control, gray scale modulation and other features described more particularly below.

The foregoing and other objects, features, and advantages of the invention will become more apparent from the following detailed description of several preferred embodiments as shown in the accompanying drawings.

3

Figure 4A:
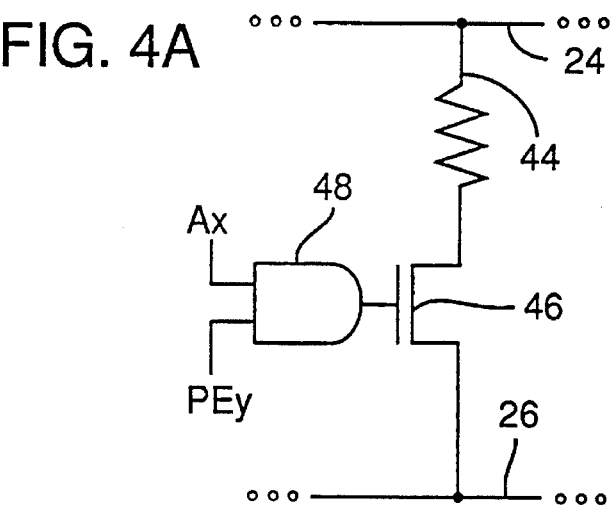
FIGS. 4A and 4B are diagrams of possible drivers for use in the driver circuitry of FIG. 3.
Figure 4B:
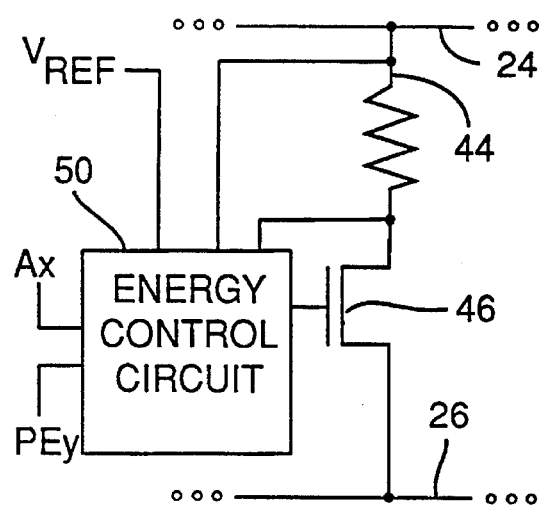
Figure 5:
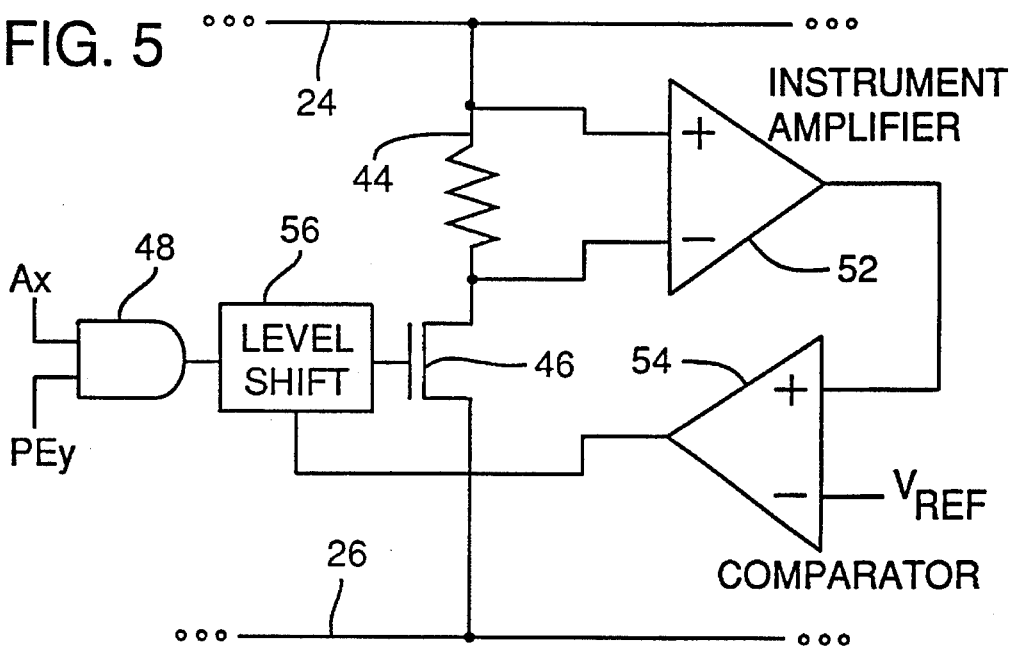

FIG. 5 is a schematic diagram of one embodiment of the energy control circuit shown in the driver design of FIG. 4B.

Figure 3:
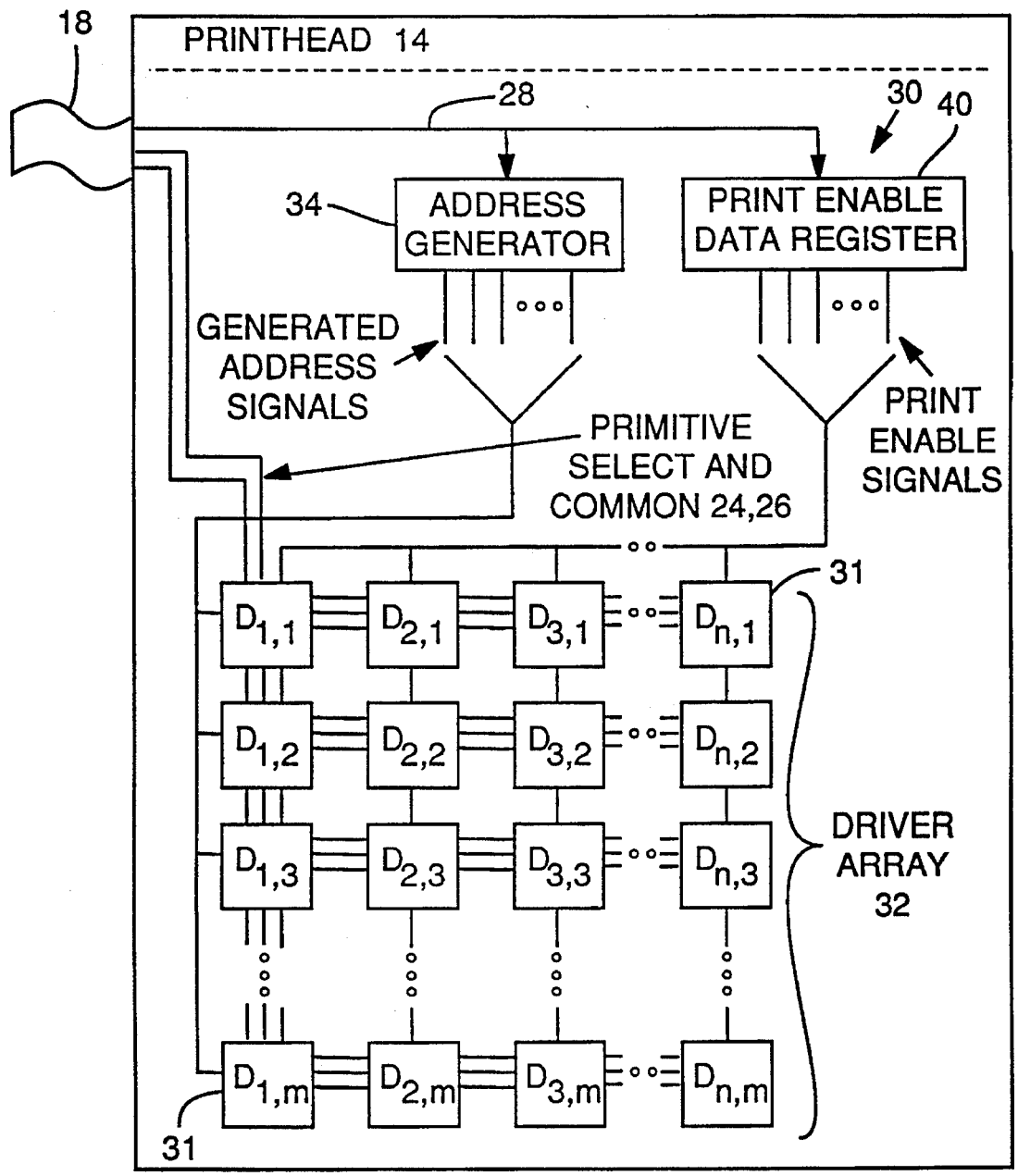
FIG. 3 is a block diagram of printhead driver circuitry according to the invention.
Figure 6:
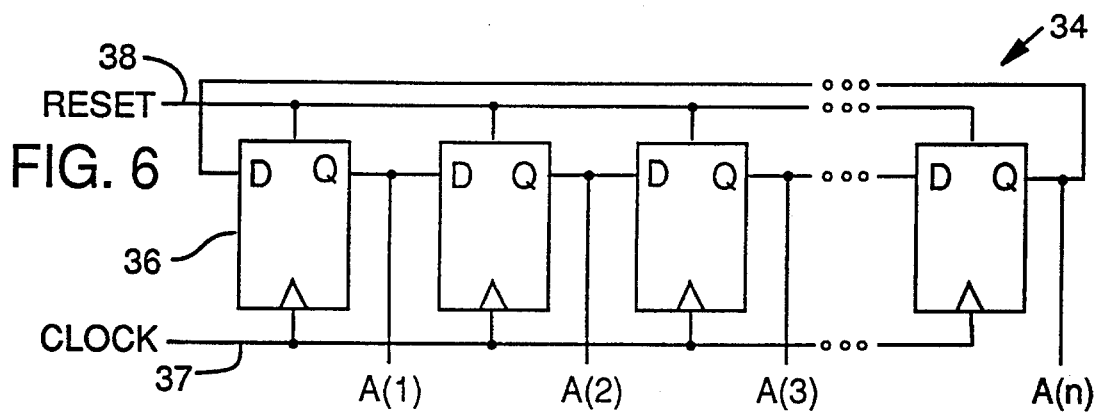

FIG. 6 is a schematic diagram of one embodiment of the address generating device shown in FIG. 3.

Figure 7:
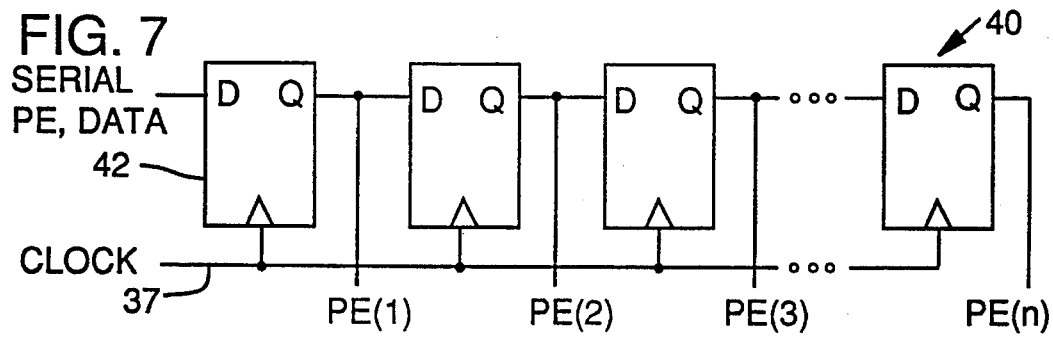

FIG. 7 is a schematic diagram of one embodiment of the print enable register shown in FIG. 3.

Figure 8:
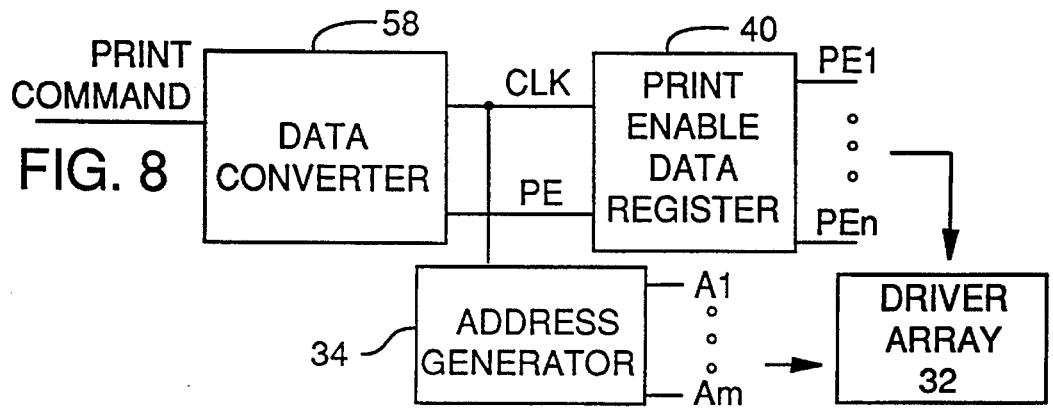

FIG. 8 is a block diagram of another embodiment of the printhead driver circuitry that includes a pulse width modulation (PWM) converter.

Figure 9:
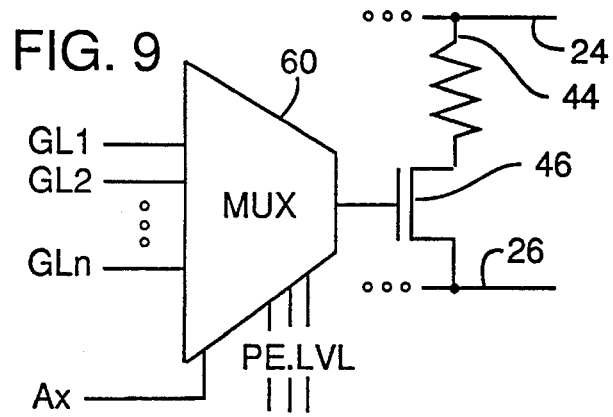

FIG. 9 is a schematic diagram of another embodiment of printhead driver circuitry that includes gray scale modulation.

Figure 10:
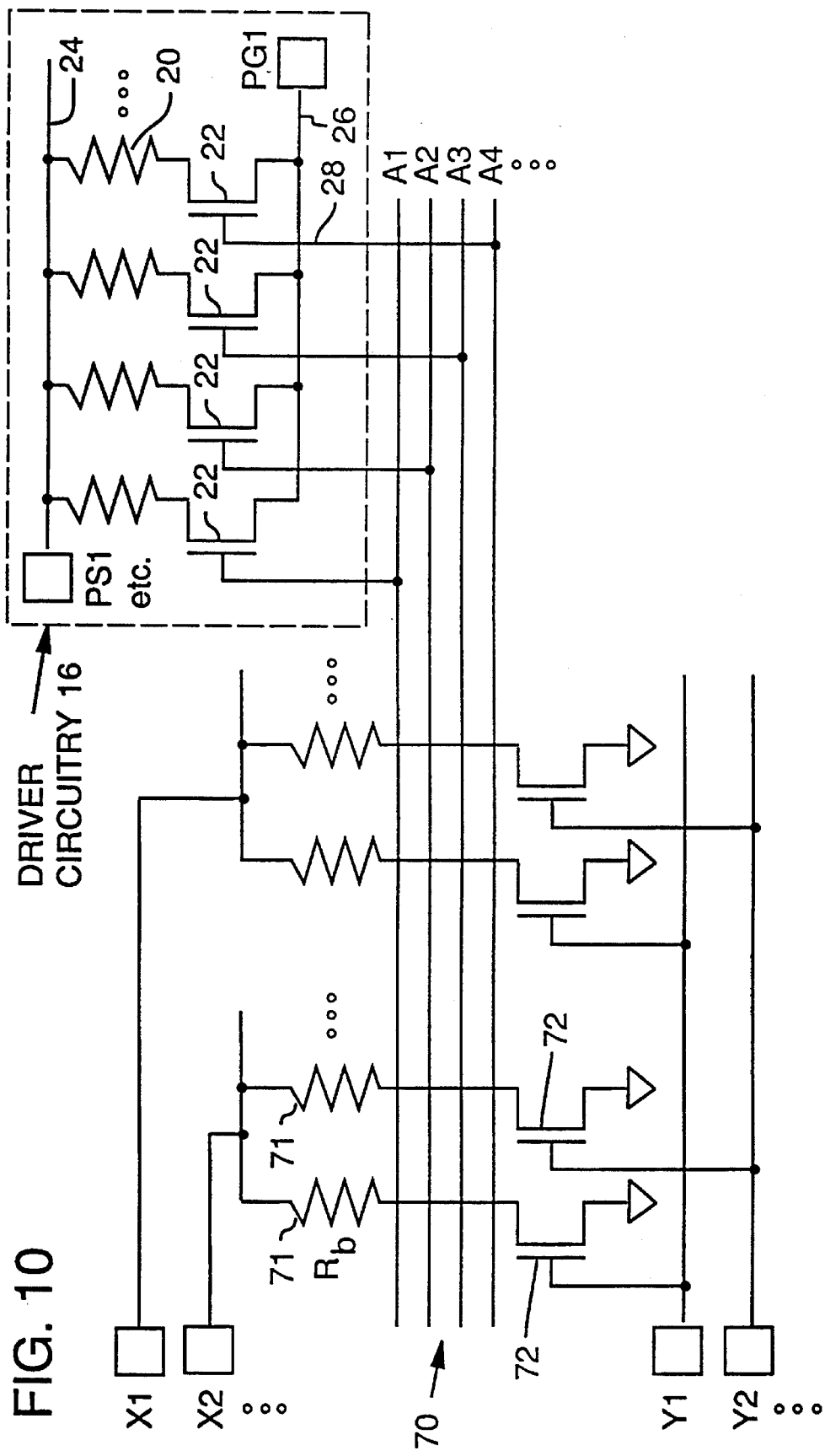

FIG. 10 is a schematic diagram of a multiplexing scheme for reducing the number of control interconnections between the printer and printhead.

DESCRIPTION OF PREFERRED EMBODIMENTS

Figure 1:
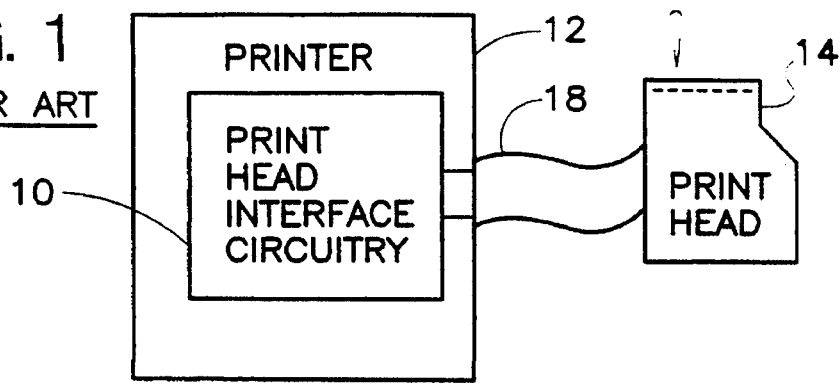
FIG. 1 is a block diagram showing a conventional printer and printhead and the interconnections between them.

FIG. 1 shows printhead interface circuitry 10 with an inkjet printer 12 and an IDH inkjet printhead 14. Printing commands are transmitted from the interface circuitry 10, which is conventional in design, to driver circuitry on the printhead 14 through multiple interconnections 18. These interconnections 18 include primitive selects, primitive commons and control interconnections. The interconnections 18 are operably connected to the driver circuitry on the printhead 14 through various connecting pads for controlling the energizing of heater resistors.

The Basic Embodiment

Figure 2:
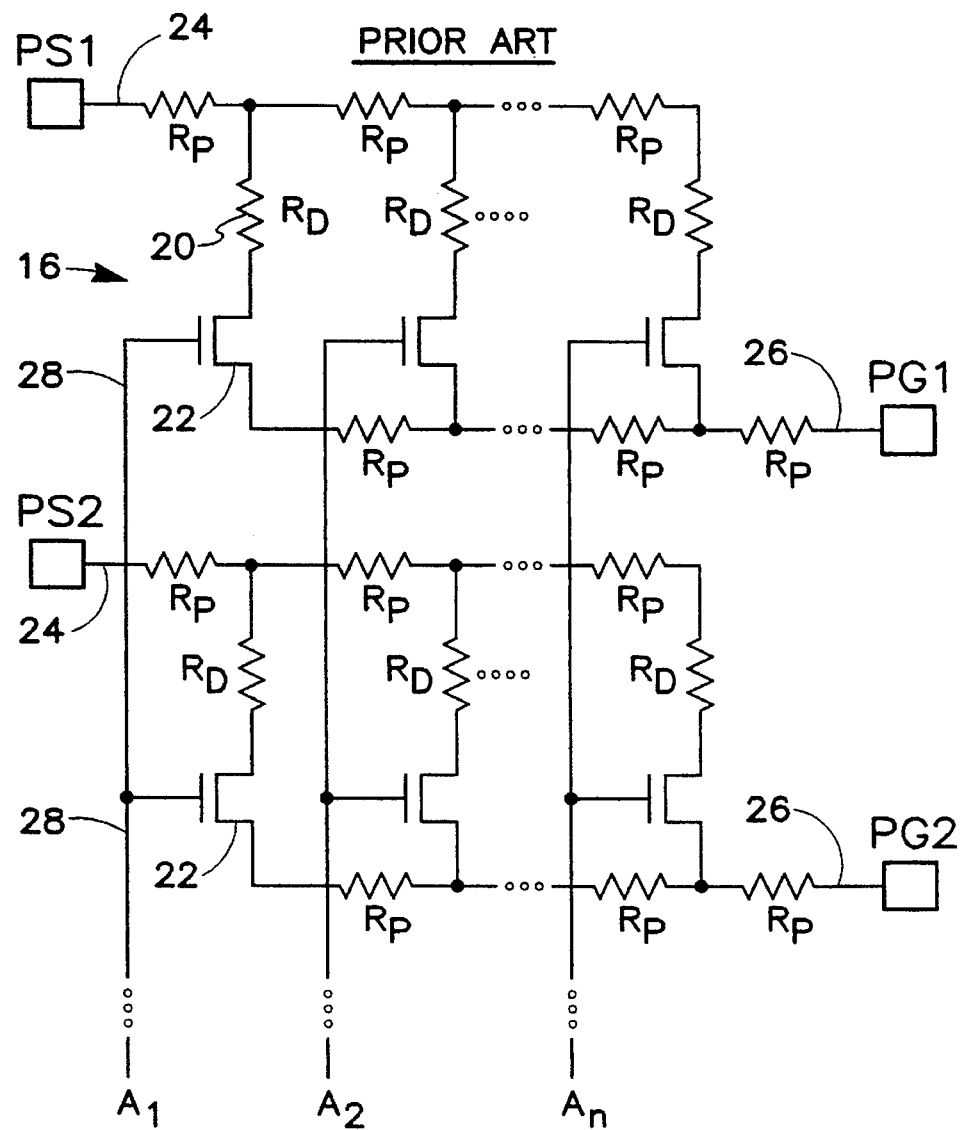
FIG. 2 is a schematic diagram of a conventional driver matrix in the printhead of FIG. 1.

FIG. 2 illustrates a driver matrix (rectangular array) within driver circuitry 16 on the printhead 14 for selecting which drivers to fire in response to print commands from the printer. While the matrix will be described in terms of rows and columns, it should be understood that these terms are not meant to imply physical limitations on the arrangement of drivers within the matrix or on the printhead. Drivers may be arranged in any manner so long as they can be identified in the matrix by two enable signals within the print command. Each driver generally comprises a heater resistor ($R_D$) 20, a switching device 22, a primitive select 24, a primitive common 26 and a control interconnection 28 (parasitic resistances ($R_p$) are also shown). The switching device 22 is connected in series with the resistor 20 between the primitive select 24 and primitive common 26. The control interconnection 28 is also connected to the switching device 22 for switching the device 22 between a conductive state and a nonconductive state. In the conductive state, the device 22 completes a circuit from the primitive select 24 through the resistor 20 to the primitive common 26 to energize the heater resistor.

Each row of drivers in the matrix is a primitive and may be selectively fired by powering the associated primitive select ("power") interconnection 24, such as PS1 for the top row shown in FIG. 2. To provide uniform energy per heater resistor 20, the parasitic resistances $R_p$ of the primitive select and common interconnections are carefully balanced as shown and only one resistor 20 is energized at a time per primitive. However, any number of the primitive selects may be enabled concurrently. Each enabled primitive select 24 such as PS1, PS2, etc., thus delivers both power and one of the enable signals to the driver circuitry 16. The other enable signal for the driver matrix is an address signal provided by each control interconnection 28, such as A1, A2, etc., only one of which is preferably active at a time. Each control interconnection 28 is tied to all of the switching devices 22 in a matrix column so that all such switching devices are conductive when the interconnection is enabled or "active," i.e. at a voltage level which turns on the switching devices 22. Where a primitive select interconnection 24 and a control interconnection 28 for a heater resistor $R_D$ 20 are both active concurrently, that resistor 20 is energized. Alternatively, each matrix column could be a primitive or other defined group of drivers and each row could be a column or other defined group of drivers tied to a single control interconnection 28. "Matrix" as used herein refers to an electrical, not physical, relationship.

The interconnections for controlling the printhead driver circuitry of FIG. 2 include separate primitive select and primitive common interconnections for each primitive and separate control interconnections for each matrix column. A typical driver matrix comprises an array of 8 primitives and 13 columns, requiring 29 interconnections. Increasing the number of drivers to 300 with a similar matrix would only increase the number of interconnections to 49.

The Advanced Embodiment

FIG. 3 shows an advanced embodiment of printhead driver circuitry 30 for minimizing the number of interconnections 24, 26 and 28. Primitive select interconnection 24 and common interconnection 26 provide constant power to an array 32 of drivers 31. "Array," like matrix, as used herein refers to an electrical, not physical, relationship. At a minimum, one of each interconnections 24 and 26 is required for the entire array of drivers, assuming the parasitic resistances $R_p$ in the array 32 are balanced throughout. Because such balancing may be difficult to achieve in practice, it may be desirable to have the array 32 divided into primitives each with interconnections 24, 26 connected in the manner shown in FIG. 2. Alternatively, an energy control circuit may be incorporated into the driver circuitry 30, as will be discussed.

Control interconnection 28 provides a print command from the printer interface circuitry 10 to the driver circuitry 30. The print command includes an address generating signal such as a clock signal and a print enable signal. These two signals may be carried on separate interconnections 28 or combined using known data compression techniques in a signal on a single interconnection, as will be described. Whichever way the two signals arrive at the printhead 14, they are directed to different components of circuitry 30 for selecting one or more drivers 31 from a driver array 32 having n-by-m drivers.

One of these components is an address generator 34 which receives the print command and in response generates address signals for the drivers 31 of array 32. The address generator 34 has an input for receiving the address generating signal and a plurality of address lines as outputs for transmitting address signals to the drivers of the array 32. Preferably only one of the address lines is active at one time, although it may be possible to have generator 34 produce concurrent address signals if desired. Each of these lines is interconnected to a row of drivers in the array 32 such that each driver in the row receives the address. The address generator 34 may be a state machine, circular shift register or other equivalent device that can receive an address generating signal and in response generate multiple address signals. FIG. 6 shows a shift register embodiment of such a generator 34 comprising a number of D flip flops 36 connected from output to input. The address generating signal in this example is a clock signal 37 within the print command which is applied to a clock input on each of the flip flops 36. The outputs of the generator 34, A(1), A(2), . . . , A(n) are active individually in sequential order. A reset input may also be provided for receiving an reset signal 38 from the printer. A reset of generator 34 to an initial state may be desired at power up of the printer or other appropriate times in the printing process.

Returning to FIG. 3, another of the components of the driver circuitry 30 for selecting a driver 31 to fire is a print control device such as print enable data register 40. Register 40 receives the print command and in response generates one or more print enable signals. The function of these print enable signals is analogous to the enabling function provided by primitive select interconnections 24, 26 in the embodiment of FIG. 2. Specifically, register 40 converts a serial stream of print enable signals it receives from the printer 12 into a format for applying the print enable signals concurrently to one or more columns of drivers in array 32. FIG. 7 shows one embodiment of the register 40 in the form of a serial-to-parallel shift register comprising a row of connected D flip flops 42. The print command data is applied serially to the D input of the first flip flop and clocked through to the output of the mth flip flop, which corresponds to the mth column in the array 32. The outputs of the flip flops 42 are provided in parallel. A clock signal for clocking the D flip flops 42 may be the same clock signal that forms the address generating signal for address generator 34 or may be a separate signal.

The drivers D1,1 through Dn,n may be constructed in a number of ways. A preferred design is shown in FIG. 4A, where each driver 31 comprises a heater resistor 44, an associated switching device 46 such as a MOSFET in series with the resistor, and a logic gate 48 such as a two-input AND gate connected for controlling the switching device 46. The resistor 44 and switching device 46 are operably connected between a power interconnection 24 and a common interconnection 26. The inputs to the gate 48 are an address signal from the generator 34, such as signal Ax (where x indicates the xth row of the array 32), and a print enable signal PEy from register 40 (where y represents the yth column of the array 32). The switching device 46 is driven between conductive and nonconductive states by the presence or absence of these two signals at the logic gate 48. Thus in response to a print command from the printer 12 to fire a particular driver, the switching device 46 energizes the associated heater resistor 44 by allowing current to flow from the power interconnection 24 through the resistor to the common interconnection 26.

Of course, it will be appreciated by those skilled in the art that a number of equivalent devices could be substituted for the components described above. For example, in this particular embodiment, a circuit is completed through the heater resistor 44 when the switching device 46 is switched to a conductive state. Alternative arrangements such as switching the device 46 to a nonconductive state are possible.

Driver Circuitry with Energy Control

The number of power interconnections 24, 26 may be reduced to a minimum if the firing energy per resistor can be equalized without the use of primitives in array 32. In the ideal case, the power interconnections could be reduced to one power interconnection 24 and one common interconnection 26. This arrangement would allow more than one driver to be fired per row in the array 32 of FIG. 3 if desired.

To make this possible, a mechanism for controlling the energy provided to each heater resistor 44 is provided. FIG. 4B shows one example of such a mechanism in the form of an energy control circuit 50. The circuit 50 monitors the voltage across each heater resistor 44 and compares the monitored voltage to a reference voltage. The output of that comparison controls the strength of the drive signal applied to the gate of switching device 46 so that the switch is driven to conduct sufficiently to achieve the desired voltage across resistor 44. One form of circuit 50 is illustrated in FIG. 5. An instrument amplifier 52 measures the voltage drop across the resistor 44. The magnitude of this voltage is compared at a comparator 54 to a reference voltage REF that is the same reference voltage for each heater resistor 44 in the array 32. The output signal of the comparator 54 is applied to a level shift circuit 56 that shifts the level of voltage applied to the gate of switching device 46 in an appropriate direction. Circuit 50 and several equivalents are more fully shown and described in U.S. Pat. No. 5,083,137, commonly owned by the present assignee and hereby incorporated by reference.

Driver Circuitry with Data Decoding and Compression

FIG. 8 is a partial view of the embodiment in FIG. 3 in which a data converter 58 is placed between the interconnections from the printer 12 and the driver circuitry 30. The data converter 58 decodes an encoded electrical signal and, if the data has also been compressed, uncompresses the data as well. Any of a number of encoding schemes maybe used, including but not limited to pulse code modulation, pulse width modulation, run length limited encoding and time division multiplexing. By using such a scheme, the print command may be carried on a single interconnection or at least fewer interconnections than if no encoding is used. Data converter 58, of conventional design, converts the print command into the print enable signal and address generating signal (or address signal if address generation is not performed on the printhead).

Driver Circuitry with Gray Scale Modulation

The intensity of the ink (multi-color or black) printed by the printer 12 is a function of ink drop volume and drop velocity. This intensity can be scaled by varying the control voltage applied to the gate of switching device 46 (or switching device 22 in FIG. 2.) This voltage controls the amount of energy delivered to the heater resistor by power interconnections 24 and 26, as described above. One approach for providing for such gray scale printing is shown in FIG. 9.

A number of analog voltage levels GL1, . . . ,GLn are generated by an on- or off-printhead voltage reference and are provided as signal inputs to a selection device such as a multiplexer 60 that connects to the input of each switching device 46. PE.LVL is an m bit bus (m=$\log_2$n) which is connected to the selection inputs of multiplexer 60 and controls the selection of the analog voltage level in the multiplexer. Ax is an address signal to an enable input of multiplexer 60. This scheme requires a group of m bits of print enable data for each row of drivers in array 32. A particular driver fires when its address signal and its PE.LVL bus are both active. The analog voltage GL selected depends upon the data on the PE.LVL print enable bus.

Row Sub-Multiplexing

Referring to FIG. 10, an alternative approach to reducing the interconnections to the printhead 14 is multiplexing the control interconnections to the drivers in the circuitry 16 of FIG. 2. This approach is called "row sub-multiplexing" (RSM). By multiplexing the control interconnections into a square (or nearly square) array, the number of interconnections is twice the number of columns plus twice the square root of the number of rows. With RSM, the total number of interconnections n when optimized is reduced from $3\sqrt{\sqrt{n}}$ to $3^3\sqrt{\sqrt{n}}$.

Although the reduction in interconnections with RSM is not as dramatic as in the advanced embodiment and its variations, RSM has advantages in simplicity and the small number of active devices, e.g., transistors, required for implementation. RSM also permits fabricating the required printhead circuitry using a simple NMOS process. For example, the additional number of active devices required for RSM compared to the driver circuit 16 in FIG. 2 is equal to the number of rows in the matrix. Therefore RSM has only a negligible effect on the size of the driver circuit. In fact, depending on the specific layout of the driver circuit, RSM may actually reduce the circuit size because of the reduced number of interconnection pads. If RSM is implemented using resistor-transistor logic (RTL) structures as shown in FIG. 10, a simple NMOS process can be used to fabricate the structures.

FIG. 10 shows a simple example of RSM. Structurally, the multiplexer 70 is located on printhead 14 and comprises groups of X and Y inputs serially connected through resistors $R_b$ 71 and logic gates 72. A control line Ai is connected at one location to a node between each resistor $R_b$ and gate 72 and at another location to a switching device 22 within driver circuitry 16. Each input group has a single X input and multiple paths each through a resistor $R_b$, gate and Y input as desired. The Y inputs are common to multiple groups. A control line Ai is enabled if the Xi input signal is enabled and the Yi input signal is disabled.

In RSM operation, the control lines A1, . . . , Ai to the switching devices 22 are sequentially enabled one at a time. To enable line A1 for example, inputs X1 and Y2 are enabled and inputs X2 and Y1 are disabled. In similar fashion, control lines A2, . . . , Ai are sequentially enabled.

The power consumed by the row multiplexer 70 depends inversely on the resistance of resistors $R_b$. The resistors must have enough resistance that the power consumed does not contribute to excessive printhead temperature, which can degrade print quality. However, the switching time for turning on the drivers 31 within driver circuitry 16 is proportional to the value of the resistors $R_b$. The desire for low printhead temperature and fast switching time are thus in conflict. One way of reducing switching time, power consumption and temperature is to increase the number of X inputs and decrease the number of Y inputs. But this option increases both the number of interconnections and the number of active devices from the minimum set forth above.

Having described and illustrated the principles of the invention with reference to a preferred embodiment and several variations thereon, it should be readily apparent to those skilled in the art that the embodiment can be modified without departing from such principles. We recognize that the principles of this invention can be applied to a wide variety of equivalent embodiments. For example, the address signals may come directly from the printer over interconnections rather than being generated within driver circuitry 30, if desired. Components such as logic gates 48 and switching devices 46 may be interchanged with analog or software-based equivalent structure such as look up tables, comparison operations, etc. Therefore, the illustrated embodiments should be considered as an examples only of our preferred forms of the invention and not as limitations on the scope of the invention. We claim as the invention all embodiments of the invention that come within the scope and spirit of the following claims.

We claim:

1. A thermal inkjet printhead for interconnection to a printer, comprising:

a power interconnection for providing power to the printhead;

a plurality of heater resistors, each operably connected with essentially balanced parasitic resistances to the constant power connection;

a plurality of power switching devices, one power switching device of the plurality of power switching devices coupled to each heater resistor, for selectively energizing the heater resistors with power from the power interconnection;

a sequential address signal generator which generates an address signal specifying a first number of at least two but fewer than all of the plurality of power switching devices; and a control interconnection for providing a print command to the printhead, the print command including a print enable signal specifying a second number of the plurality of power switching devices, whereby each of the power switching devices energizes the heater resistor coupled thereto when both the address signal and the print enable signal are present for a power switching device which is a member of both the first number and the second number of power switching devices.

2. The printhead of claim 1 wherein said switching devices are interconnected in a circuit including said heater resistors, the power interconnection and a return path to complete the circuit, each of the switching devices switchable between a conductive state and a nonconductive state.

3. The printhead of claim 1 wherein the print command further comprises an address clock signal and the address signal generator further comprises an input to accept the address clock signal to synchronize the address signal.

4. The printhead of claim 1 including a print control device for converting a serial stream of print enable signals into a format for applying print enable signals concurrently to one or more switching devices.

5. The printhead of claim 3 wherein the address signal generator is a state machine generating a sequence of address signals.

6. The printhead of claim 3 wherein the address signal generator is a circular shift register.

7. The printhead of claim 1 wherein the printhead further includes:

a print control device for applying print enable signals to the switching devices, wherein the switching devices are organized into a matrix, one matrix group of switching devices receiving a same print signal and another matrix group of switching devices receiving a same address signal.

8. The printhead of claim 1 wherein the printhead further includes:

a data converter for receiving a print command from the printer and converting the print command into the print enable signal; and a print control device for applying print enable signals and address signals to the power switching devices.

9. The printhead of claim 1 including a gate operably connected to at least one of the switching devices and responsive to the print enable signal and the address signal for operating the at least one switching device to energize the heater resistor coupled thereto.

10. A method of selectively energizing heater resistors on a printhead interconnected to a printer, comprising:

providing constant power to the printhead;

connecting a plurality of heater resistors through essentially balanced parasitic resistances to the provided constant power;

providing a plurality of power switching devices, one power switching device of the plurality of power switching devices coupled to each heater resistor, for selectively energizing the heater resistors with power from the power interconnection;

generating a sequential address signal to specify a first number of at least two but fewer than all of the plurality of power switching devices; and coupling a print command to selected heater resistors, the print command including the address signal and a print enable signal to specify a second number of the plurality of power switching devices, whereby each of the power switching devices energizes the associated heater resistor coupled thereto when both the address signal and the print enable signal are present for a power switching device which is a member of both the first number and the second number of power switching devices.

11. The method of claim 10 wherein coupling a print command comprises sending a print command from the printer on a single interconnection between the printer and the printhead.

12. The method of claim 10 wherein providing constant power to the printhead comprises sending a constant power signal from the printer on a single interconnection between the printer and the printhead.

13. A thermal inkjet printhead for interconnection to a printer, comprising:

a power interconnection for providing power to the printhead;

a control interconnection for providing a print enable signal and an address generating signal to the printhead;

a plurality of heater resistors, each operably connected with essentially balanced parasitic resistances to the power interconnection;

a plurality of power switching devices, one power switching device of the plurality of power switching devices coupled to each heater resistor, for selectively energizing the heater resistors with power from the power interconnection;

a register for receiving a print enable signal from a control interconnection and applying the print enable signal to one or more switching devices; and a sequential address generating device for receiving an address generating signal from a control interconnection and generating a sequential address signal for one or more switching devices, the switching devices responsive to the address signal and the print enable signal for selectively energizing the heater resistors.

14. The printhead of claim 13 wherein the power interconnection provides constant power to the printhead.

15. The printhead of claim 13 wherein a single control interconnection provides the address generating signal and the print enable signal.

16. A thermal inkjet printhead for interconnection to a printer, comprising:

a power interconnection for providing constant power to the printhead;

a control interconnection for providing a print command to the printhead, the print command including an address synchronizing signal and a print enable signal;

an address generating device, coupled to the control interconnection, for generating address signals in response to the address synchronizing signal from the print command;

a print control device, coupled to the control interconnection, for receiving print enable signals from the print command;

a plurality of heater resistors, each operably connected with essentially balanced parasitic resistances to the constant power interconnection; and a plurality of power switching devices each coupled to an associated one of the heater resistors for selectively energizing heater resistors with power from the power interconnection, the power switching devices organized into a matrix of groups wherein each of the plurality of power switching devices is a member of a group receiving a same address signal from the address generating device and is also a member of another group receiving a same print enable signal from the print control device, a power switching device responsive to the presence of the address signal and print enable signal.

17. A thermal inkjet printhead for interconnection to a printer, comprising:

a power interconnection for providing constant power to the printhead a control interconnection for providing a print command to the printhead, the print command including an address synchronizing signal and a print enable signal;

a data converter for receiving a print command from the printer and converting the print command into the print enable signal;

an address generating device for generating a sequential pattern of address signals in response to the address synchronizing signal;

a print control device for receiving print enable signals from the data converter;

a plurality of heaters resistors, each operably connected with essentially balanced parasitic resistances to the constant power interconnection; and a plurality of power switching devices associated with the heater resistors for selectively energizing heater resistors with power from the power interconnection, each power switching device responsive to the presence of an address signal from the address generating device and a print enable signal from the print control device to energize one heater resistor.

* * * * *